US009424648B2

United States Patent
Tzoumas et al.

(10) Patent No.: US 9,424,648 B2
(45) Date of Patent: Aug. 23, 2016

(54) METHOD AND SYSTEM FOR DEVICE DETECTION IN 2D MEDICAL IMAGES

(75) Inventors: Stratis Tzoumas, Athens (GR); Peng Wang, Princeton, NJ (US); Yefeng Zheng, Dayton, NJ (US); Matthias John, Nürnberg (DE); Dorin Comaniciu, Princeton Junction, NJ (US)

(73) Assignee: Siemens Aktiengesellschaft, Munich (DE)

( * ) Notice: Subject to any disclaimer, the term of this patent is extended or adjusted under 35 U.S.C. 154(b) by 482 days.

(21) Appl. No.: 13/539,702

(22) Filed: Jul. 2, 2012

(65) Prior Publication Data

US 2013/0011030 A1    Jan. 10, 2013

Related U.S. Application Data

(60) Provisional application No. 61/505,131, filed on Jul. 7, 2011.

(51) Int. Cl.
  *G06K 9/00*      (2006.01)
  *G06T 7/00*      (2006.01)
  *G06K 9/62*      (2006.01)

(52) U.S. Cl.
  CPC .......... *G06T 7/0044* (2013.01); *G06K 9/6282* (2013.01); *G06T 2207/10064* (2013.01); *G06T 2207/30021* (2013.01)

(58) Field of Classification Search
  None
  See application file for complete search history.

(56) References Cited

U.S. PATENT DOCUMENTS

| | | | |
|---|---|---|---|
| 6,961,608 B2 | 11/2005 | Hoshino et al. | |
| 7,916,919 B2 | 3/2011 | Zheng et al. | |
| 7,920,911 B2 | 4/2011 | Hoshino et al. | |
| 2009/0062641 A1 | 3/2009 | Barbu et al. | |
| 2009/0154785 A1* | 6/2009 | Lynch et al. | 382/131 |
| 2010/0239148 A1 | 9/2010 | Zheng et al. | |
| 2010/0249579 A1 | 9/2010 | Starks | |
| 2011/0164035 A1 | 7/2011 | Liao et al. | |
| 2012/0093397 A1 | 4/2012 | Wang et al. | |
| 2012/0123250 A1 | 5/2012 | Pang et al. | |
| 2012/0238866 A1 | 9/2012 | Wang et al. | |

OTHER PUBLICATIONS

Lin, Zhe et al., "A Pose-Invariant Descriptor for HUman Detection and Segmentation," ECCV 2008, Part IV, LNCA 5303, pp. 423-436, 14 pages.*

Rogez, Gregory et al.," Randomized Trees for Human Pose Detection," IEEE Conference on Computer Vision and Pattern Recognition, 2008, 8 pages.*

Brost, Alexander et al. "3-D Respiratory Motion Compensation during EP Procedures by Image-Based 3-D Lasso Catheter Model Generation and Tracking," MICCAI 2009, Part I, LNCS 5761, pp. 394-401, 2009, 8 pages.*

Zheng, Yefeng, et al. "Four-chamber heart modeling and automatic segmentation for 3-D cardiac CT volumes using marginal space learning and steerable features." Medical Imaging, IEEE Transactions on 27.11 (2008): 1668-1681. 14 pages.*

(Continued)

*Primary Examiner* — Sumati Lefkowitz
*Assistant Examiner* — Ryan P Potts

(57) ABSTRACT

A method and system for device detection in a 2D medical image. In order to account for shape variation of a 3D object in a 2D imaging plane, a hierarchical tree-structured array of trained classifiers is used to detect a 3D object, such as a pigtail catheter in a 2D medical image, such as a fluoroscopic image. The hierarchical tree-structured array of trained classifiers increases a dimensionality of the search space with each hierarchical level, and as the search space is increased, the classification is split into object sub-classes using trained classifiers independently trained for each sub-class.

30 Claims, 9 Drawing Sheets

(56) References Cited

OTHER PUBLICATIONS

Tu, Zhuowen. "Probabilistic boosting-tree: Learning discriminative models for classification, recognition, and clustering." Computer Vision, 2005. ICCV 2005. Tenth IEEE International Conference on. vol. 2. IEEE, 2005. 9 pages.*

Carneiro, Gustavo, et al. "Detection and measurement of fetal anatomies from ultrasound images using a constrained probabilistic boosting tree." Medical Imaging, IEEE Transactions on 27.9 (2008): 1342-1355. 14 pages.*

Zheng, Yefeng, et al. "Robust object detection using marginal space learning and ranking-based multi-detector aggregation: Application to left ventricle detection in 2D MRI images." Computer Vision and Pattern Recognition, 2009. CVPR 2009. IEEE Conference on. IEEE, 2009. 8 pages.*

Zheng, Yefeng, et al. "Constrained marginal space learning for efficient 3D anatomical structure detection in medical images." Computer Vision and Pattern Recognition, 2009. CVPR 2009. IEEE Conference on. IEEE, 2009. 8 pages.*

\* cited by examiner

METHOD AND SYSTEM FOR DEVICE DETECTION IN 2D MEDICAL IMAGES

This application claims the benefit of U.S. Provisional Application No. 61/505,131, filed Jul. 7, 2011, the disclosure of which is herein incorporated by reference.

BACKGROUND OF THE INVENTION

The present invention relates to a method and system for device detection in medical images, and more particularly, to detection of a three-dimensional (3D) device, such as a pigtail catheter, in two-dimensional (2D) medical images.

During surgical interventions, catheters are typically inserted into a patient's vessels and guided to, or placed at, a specific position. The automatic detection of such catheters can provide aid to the surgeon. For example, the automatic detection of such catheters can be used for improved visualization or motion compensation for the image-guided procedures.

The projection of 3D device onto a 2D image plane can cause shape variation of medical device. The shape of device on the 2D projection plan depends on the projection angle, and also is affected by continuous body motion.

In the case of transcatheter aortic valve implantation (TAVI), the silhouette of an extracted aorta model can be overlaid on a 2D fluoroscopic video sequence, to visually aid the physician in the placement of the artificial valve. However, since the actual position of the aorta is highly influenced by cardiac and respiratory motion, a mere overlay may not be sufficient. During a TAVI intervention, an agent-injecting pigtail catheter is typically inserted into the aorta. This pigtail catheter is typically inserted into a valve pocket during the intervention, and therefore follows the motion of the aorta. By successfully detecting and tracking the pigtail catheter in the intra-operative fluoroscopic images, it is possible to compensate the motion of the aorta and correctly project the 3D model of the aorta onto its position in each 2D image, thus providing visualization of the aorta without contrast injection.

The tip of the pigtail catheter has an appearance that can vary according to the projection angle of the fluoroscopic image sequence. The appearance of the pigtail catheter tip is also radically altered when contrast agent is injected. Furthermore, during surgical interventions, a number of other devices may also be visible in the proximal area of the pigtail catheter, causing frequent occlusion and clutter. Due to the large inter-class variation in the shape and appearance of the pigtail catheter, as well as low image quality and occlusion and clutter, real-time detection of the pigtail catheter tip can be a very challenging task.

BRIEF SUMMARY OF THE INVENTION

The present invention provides a method and system for device detection in 2D medical images. Embodiments of the present invention utilize a probabilistic framework for robust real-time device detection. The probabilistic framework utilizes multi-shape object detection to overcome the challenges created by device shape variation in 2D images.

In one embodiment of the present invention, candidates for a target object are detected in a 2D medical image using a hierarchical tree-structured array of trained classifiers. The hierarchical tree-structured array of trained classifiers includes a first classifier trained for a class of objects to detect object candidates in a first search space. The trained classifier also includes a plurality of second classifiers, each trained for a respective one of a plurality of sub-classes of the object class to detect object candidates of the respective one of the plurality of sub-classes in a second search space having a greater dimensionality than the first search space based on the object candidates detected by the first classifier.

These and other advantages of the invention will be apparent to those of ordinary skill in the art by reference to the following detailed description and the accompanying drawings.

DETAILED DESCRIPTION

The present invention is directed to a method and system for device detection in 2D medical images. Embodiments of the present invention are described herein to give a visual understanding of the device detection method. A digital image is often composed of digital representations of one or more objects (or shapes). The digital representation of an object is often described herein in terms of identifying and manipulating the objects. Such manipulations are virtual manipulations accomplished in the memory or other circuitry/hardware of a computer system. Accordingly, it is to be understood that embodiments of the present invention may be performed within a computer system using data stored within the computer system.

Figure 1:
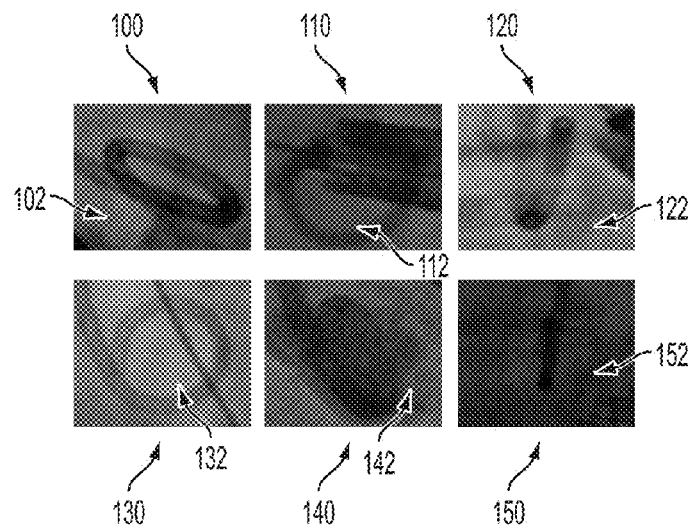
FIG. 1 illustrates examples of pigtail catheter tip shape and appearance variation in fluoroscopic images.

Embodiments of the present invention provide a method for detecting a 3D device in a 2D image plane. For example, embodiments of the present invention can be used for robust, real-time a pigtail catheter tip detection in fluoroscopic images. The pigtail catheter tip has a tightly curled lip, the shape of which can appear in a fluoroscopic image as a circle, ellipsoid, or even a line according to the projection angle of the fluoroscopic image sequence. FIG. 1 illustrates examples of pigtail catheter tip shape and appearance variation in fluoroscopic images. As illustrated in FIG. 1, there is significant shape and appearance variation between the pigtail catheters 102, 112, 122, 132, 142, and 152 shown in fluoroscopic images 100, 110, 120, 130, 140, and 150, respectively. According to an advantageous embodiment of the present invention, the pigtail catheter tip object class is divided into three sub-classes which have less intra-class variation and common appearance characteristics. The sub-classes created are a circular class, an ellipsoid class, and a line class. These three sub-classes correspond to different angles between the projection plane of 2D fluoroscopy and the pigtail catheter tip plane.

Figure 2:
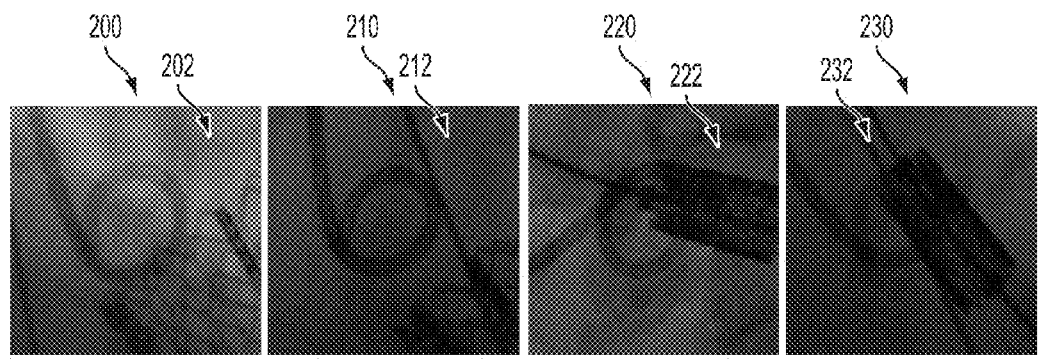
FIG. 2 illustrates circular instances of pigtail catheter tips in fluoroscopic images.

The circular class corresponds to the pigtail catheter tip plane being substantially parallel to the projection plane of the 2D image. When the pigtail catheter tip plane is substantially parallel to the projection plane, the pigtail catheter tip appears as a circle in the image. Accordingly, the target object (pigtail catheter tip) in the circular class is symmetric, and has essentially a rotationally independent visual appearance. FIG. 2 illustrates circular instances of pigtail catheter tips in fluoroscopic images. As illustrated in FIG. 2, pigtail catheter tips 202, 212, 222, and 232 appear substantially circular in the respective fluoroscopic images 200, 210, 220, and 230.

Figure 3:
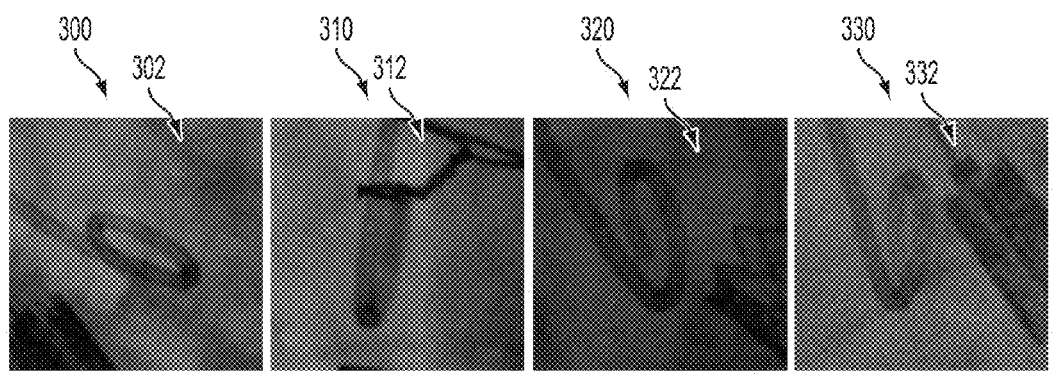
FIG. 3 illustrates ellipsoid instances of pigtail catheter tips in fluoroscopic images.

The ellipsoid class corresponds to when the pigtail catheter tip plane is neither parallel nor perpendicular to the projection plane of the 2D image. When the projection plane is not parallel or perpendicular to the pigtail catheter tip plane, the shape of the pigtail catheter tip appears as an ellipsoid in the image. The target object (pigtail catheter tip) is now non-symmetric, and thus its appearance is not rotationally independent. Accordingly, it is necessary to incorporate the orientation of the pigtail catheter tip into the detection for the ellipsoid class. FIG. 3 illustrates ellipsoid instances of pigtail catheter tips in fluoroscopic images. As illustrated in FIG. 3, pigtail catheter tips 302, 312, 322, and 332 appear an ellipsoids in the respective fluoroscopic images 300, 310, 320, and 330.

The line class corresponds to when the pigtail catheter tip plane is substantially normal (perpendicular) to the projection plane of the 2D image. When the projection plane is substantially normal to the plane of the pigtail catheter tip, the pigtail catheter tip appears as a line in the 2D image. In this case, there is also a need to search in different orientations of the image during detection.

By categorizing annotated training data into the three subclasses of the pigtail catheter tip, it is possible to train a simple hierarchical detector for each of one the sub-classes in order to perform separate detection for each of the three subclasses. A simple hierarchical detector trained for each of the sub-classes yields a significantly enhanced detection performance as compared to a single detector trained for the global class of all pigtail catheter tips. Accordingly, in embodiments of the present invention, different sub-classes of a target object can be handled independently in the detection procedure, both due to differences in appearance and shape, as well as differences in primitive characteristics.

According to an advantageous embodiment of the present invention, separate trained detectors for each shape variation (sub-class) of a target object are combines with the principles of Marginal Space Learning (MSL) to create a hierarchical tree-structured detection scheme that will provide accurate and fast detection results for objects with significant shape and appearance variation in 2D imaging planes, such as the pigtail catheter tip.

The idea of MSL was introduced for the purpose of enhancing speed of detections in 3D space. For example, a method for MSL-based heart chamber segmentation is described in detail in U.S. Pat. No. 7,916,919, entitled "System and Method for Segmenting Chambers of a Heart in a Three Dimensional Image", which is incorporated herein by reference. In order to efficiently detect an object using MSL, the object state (i.e., position, orientation, and scale) is estimated in a hierarchical and incremental manner in a series of marginal spaces with increasing dimensionality. That is, the object state set are marginally increased from one stage to the next stage of detection. At each stage, a new state is included in the detection and the object state is searched in the enlarged state space. By using MSL, the number of training samples required during training and the number of computations during detection are both significantly reduced. In practice, MSL has advantages in both computational efficiency and accuracy compared to direct training and detection of the joint state space. MSL has also been successfully modified for object detection in 2D space, as described in United States Published Patent Application No. 2012/009397, entitled "Method and System for Learning Based Object Detection in Medical Images", which is incorporated herein by reference.

MSL utilizes a hierarchical array of trained learning based detectors, where the dimensionality of the search space increases from the low to the higher levels in the hierarchy. Embodiments of the present invention combine such a hierarchical detection scheme with an array of shape-specific detectors corresponding to various sub-classes of a target object in order to yield a tree-structured hierarchical detection scheme in which the classification process splits into various sub-classes as the dimensionality of the search space expands. When applied to shape-varying objects, such as the pigtail catheter tip, such a tree-structured hierarchical detection framework can deliver better detection rates and more accurate results, while retaining high speed performance.

Figure 4:
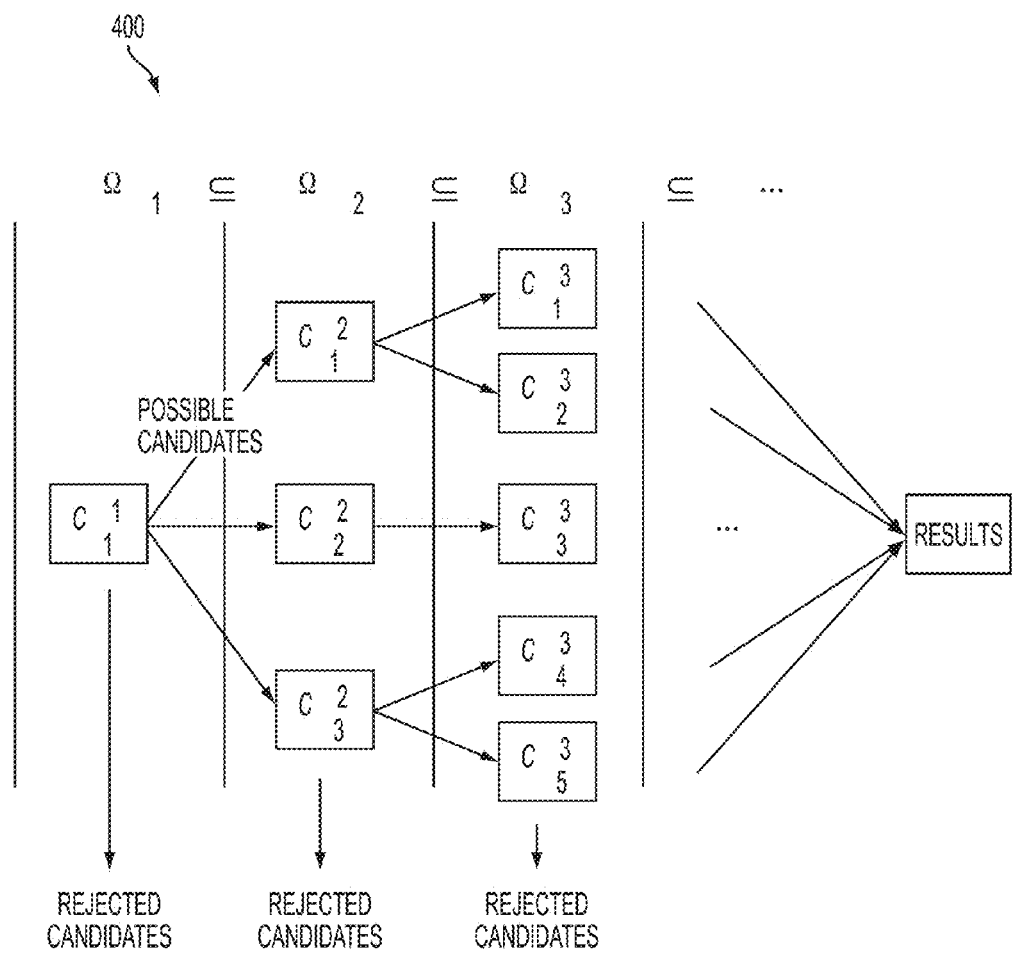
FIG. 4 illustrates a tree-structured hierarchical detection framework according to an embodiment of the present invention.

FIG. 4 illustrates a tree-structured hierarchical detection framework according to an embodiment of the present invention. As shown in FIG. 4, $\Omega_1, \Omega_2, \ldots, \Omega_n$ represent subsets of the complete search space, with $\Omega_1 \subseteq \ldots \subseteq \Omega_n$. Each level i of the tree 400 corresponds to a search space $\Omega_i$ that is a superset of the previous level search space $\Omega_{i-1}$ and a subset of the next level search space $\Omega_{i+1}$. Accordingly, the dimensionality of the search space increases at each level of the tree 400. The nodes $C_i^{dim}$ of the tree 400 represent classifiers, each of which is trained for a specific object class based on a set of annotated training data. For example, each node of the tree 400 may be a respective classifier training using a probabilistic boosting tree (PBT), but the present invention is not limited thereto. Any other type of classifiers, such as SVM, Neural Networks, can also be used at each node. The children of each node correspond to sub-classes of the parent class. Each node of the tree 400 classifies the candidates received from its parent node, rejects a portion of the candidates classified as negative, and propagates the candidates classified as positive as possible candidates to each of its children nodes. The candidates that are propagated to the next tree level are then re-sampled according to the search space expansion before being classified. That is, each candidate that is propagated to the next tree level is sampled into multiple candidates (hypotheses) at the increased dimensionality of search space of the next tree level, and each of the multiple candidates resulting from the sampling is then classified by the classifier at the next tree level. The detection process using the tree-structured hierarchical detection framework of FIG. 4 is probabilistic, and the probability of each candidate is incrementally updated as the candidate is propagated from the root node to the leaves of the tree 400. In the last level of the tree 400 the remaining positively classified candidates are merged and sorted according to their probability. The search space of the last level of the tree corresponds to a full parameter space of the target object being detected. The number of leave nodes (i.e., nodes in the last level of the tree) corresponds to the number of sub-classes (e.g., shape variations) of the target object.

Let $class_{dim,i}$ be the sub-class of objects that corresponds to the classifier in the node $C_i^{dim}$. The operator super can be defined as:

$$super(class_{n,i}) = class_{n-1,k},$$

where $class_{n,i}$ is a sub-class of $class_{n-1,k}$. The following recursive type can be defined for the calculation of the probability in each node $C_i^{dim}$ of the tree:

$$P_{U_{dim}}(class_{dim,k}|Z) \propto P(Z|Class_{dim,k})$$

$$\sum_{super(class_{dim,k})} P(class_{dim,k}|super(class_{dim,k})) P_{\Omega_{dim-1}}(super(class_{dim,k})|Z)$$

where $\Sigma P(class_{dim,k}|super(class_{dim,k})) P_{\Omega_{dim-1}}(super(class_{dim,k})|Z)$ is the prior probability attributed to the candidate from the previous nodes, and $P_{\Omega_{dim}}(Z|class_{dim,k})$ is the probability according to the classification in node $C_i^{dim}$. With the above recursive type defining the probability of the leave nodes, the posterior probability of a candidate Z can be calculated using the following equation:

$$P_{post}(class_N|Z) = |P_{\Omega_N}(class_{N,1}|Z), \ldots, P_{\Omega_N}(class_{N,K}|Z)|_\infty$$

where K is the number of leaves of the tree (number of sub-classes in the last level) and N is the depth of the tree (the number of divisions in the search space).

Figure 5:
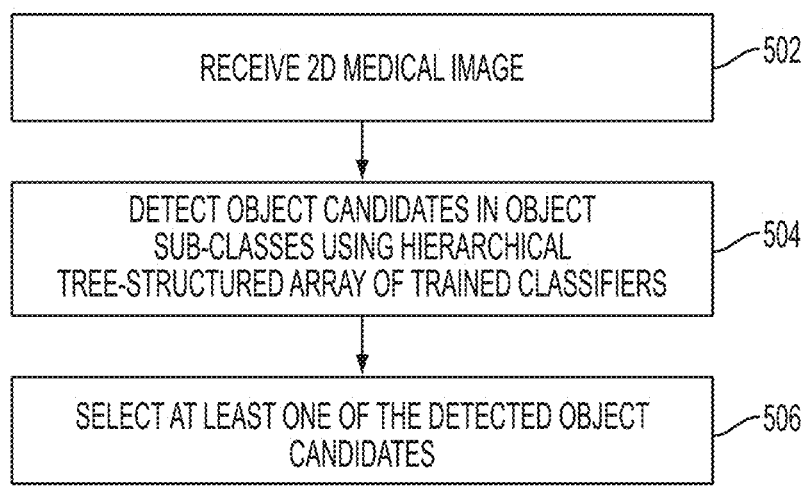
FIG. 5 illustrates a method for detection of a target object in a 2D image according to an embodiment of the present invention.

FIG. 5 illustrates a method for detection of a target object in a 2D image according to an embodiment of the present invention. As illustrated in FIG. 5, at step 502, a 2D medical image is received. For example, the 2D medical image may be a fluoroscopic image or an ultrasound image, but the present invention is not limited thereto. In one possible implementation, a 2D medical image is received in real-time from an image acquisition device, such as an x-ray scanning device, during a surgical procedure, such as a cardiac intervention. It is also possible that the 2D medical image is received by loading a previously acquired 2D medical image.

At step 504, object candidates in various sub-classes of the object are detected using a hierarchical tree-structured array of trained classifiers, such as the hierarchical tree-structured framework shown in FIG. 4. The object can be a pigtail catheter tip, any other medical device, or an anatomical structure in the 2D image. The detection of a pigtail catheter tip is described in greater detail below. As described above with respect to FIG. 4, the dimensionality of the search space increases and with each hierarchical level of the hierarchical tree-structured array of trained classifiers. As the search space increases the classification of an object class is also split into classification of object sub-classes using classifiers trained based on the object sub-classes in the training data. The final hierarchical level of hierarchical tree-structured array of trained classifiers includes a number leaf nodes that detect candidates and their corresponding posterior probabilities in a respective number of object sub-classes.

At step 506, at least one of the object candidates detected using the hierarchical tree-structured array of trained classifiers is selected. The object candidate can represent a full similarity transform (position, orientation, and scale) that corresponds to a bounding box defining the pose of the target object in the 2D image. In one possible implementation, the candidate having the highest posterior probability is selected from all of the candidates in all of the object sub-classes. In another possible implementation, multiple object candidates in different object sub-classes can be selected. In this case, the candidates having the highest posterior probabilities in each of the object sub-classes are compared to determine if they are located at the same position in the 2D image. If two candidates detected using classifies trained for different object sub-classes are located at or close to the same location in the image, the candidates are merged by selecting only the candidate with the higher posterior probability.

Figure 6:
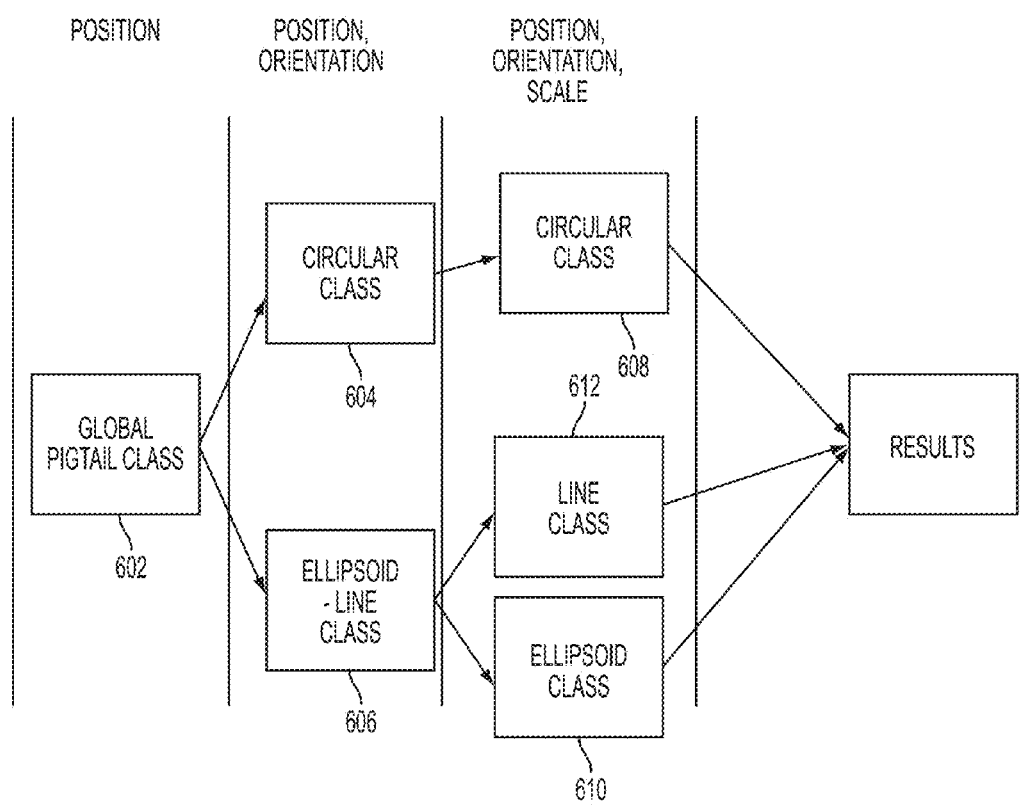
FIG. 6 illustrates a hierarchical tree-structured array of trained classifiers for detecting a pigtail catheter tip in a 2D fluoroscopic image according to an embodiment of the present invention.

FIG. 6 illustrates a hierarchical tree-structured array of trained classifiers for detecting a pigtail catheter tip in a 2D fluoroscopic image according to an embodiment of the present invention. As shown in FIG. 6, for the pigtail case, the tree detection scheme described above with respect to FIG. 4 is used and combined with the pigtail catheter tip shape categorization. Every node 602, 604, 606, 608, 610, and 612 of the tree 600 corresponds to a hierarchical classifier trained for a specific sub-class of the data set. In a possible implementation each node 602, 604, 606, 608, 610, and 612 of the tree 600 can be trained using a probabilistic boosting tree (PBT). The root node of the tree 600 corresponds to a global pigtail catheter position classifier 602 trained using all of the pigtail catheter tip shapes in the training data. This classifier 602 searches only for position candidates for the pigtail catheter tip, performing early rejecting of non-object areas in the 2D image. The purpose of the global pigtail catheter position classifier is to feed most of the possible positions of the pigtail catheter in the 2D image as candidates to the next level of the tree, while rejecting most of the non-object regions. In the following levels of the tree, the different object sub-classes are handled independently as depicted in FIG. 6.

At the next level of the tree, the search space is expanded to position and orientation and all of the position candidates detected by the global pigtail catheter position classifier 602 are further processed by each of a circular class position-orientation classifier 604 and an ellipsoid-line class position-orientation classifier 606. The circular class position-orientation classifier 604 is a hierarchical detector trained using only circular pigtail instances in the training data. The circular class position-orientation classifier 604 samples the candidates at different orientations, but since the circular sub-class is approximately symmetric, this sampling can be rather sparse. The ellipsoid-line class position-orientation classifier 606 is a single hierarchical detector trained using ellipsoid and line pigtail catheter instances in the training data. The ellipsoid-line class position-orientation classifier 606 samples the candidates at different orientations, and in this case, the orientation sampling needs to be significantly denser than in the circular case since the ellipsoid and line sub-classes are not rotation invariant. In the embodiment of FIG. 6, the ellipsoid and line sub-classes are handled together at this stage for speed enhancement and because they may correspond to small subsets of the training dataset. However, as illustrated in FIG. 6, there is a further discrimination between the ellipsoid sub-class and the line sub-class in the final stage of the hierarchy.

In the final level of the tree, the search space is expanded to position, orientation, and scale. The position-orientation candidates detected by the circular class position-orientation classifier 604 are further processed by circular class position-orientation-scale classifier 608, which is trained using only circular pigtail catheter tip instances in the training data. The position-orientation candidates detected by the ellipsoid-line class position-orientation classifier 606 are further processed by each of an ellipsoid class position-orientation-scale classifier 610, which is trained using only ellipsoid pigtail catheter tip instances in the training data, and a line class position-orientation-scale classifier 612, which is trained using only line pigtail catheter tip instances in the training data. The circular class position-orientation-scale classifier 608, ellipsoid class position-orientation-scale classifier 610, and line class position-orientation-scale classifier 612 each sample the corresponding position-orientation candidates at multiple different scales. The detection results from each of the leaf nodes 608, 610, and 612 are merged and the best detections having the highest posterior probabilities are selected to determine the pose of the pigtail catheter tip in the 2D fluoroscopic image.

Figure 7:
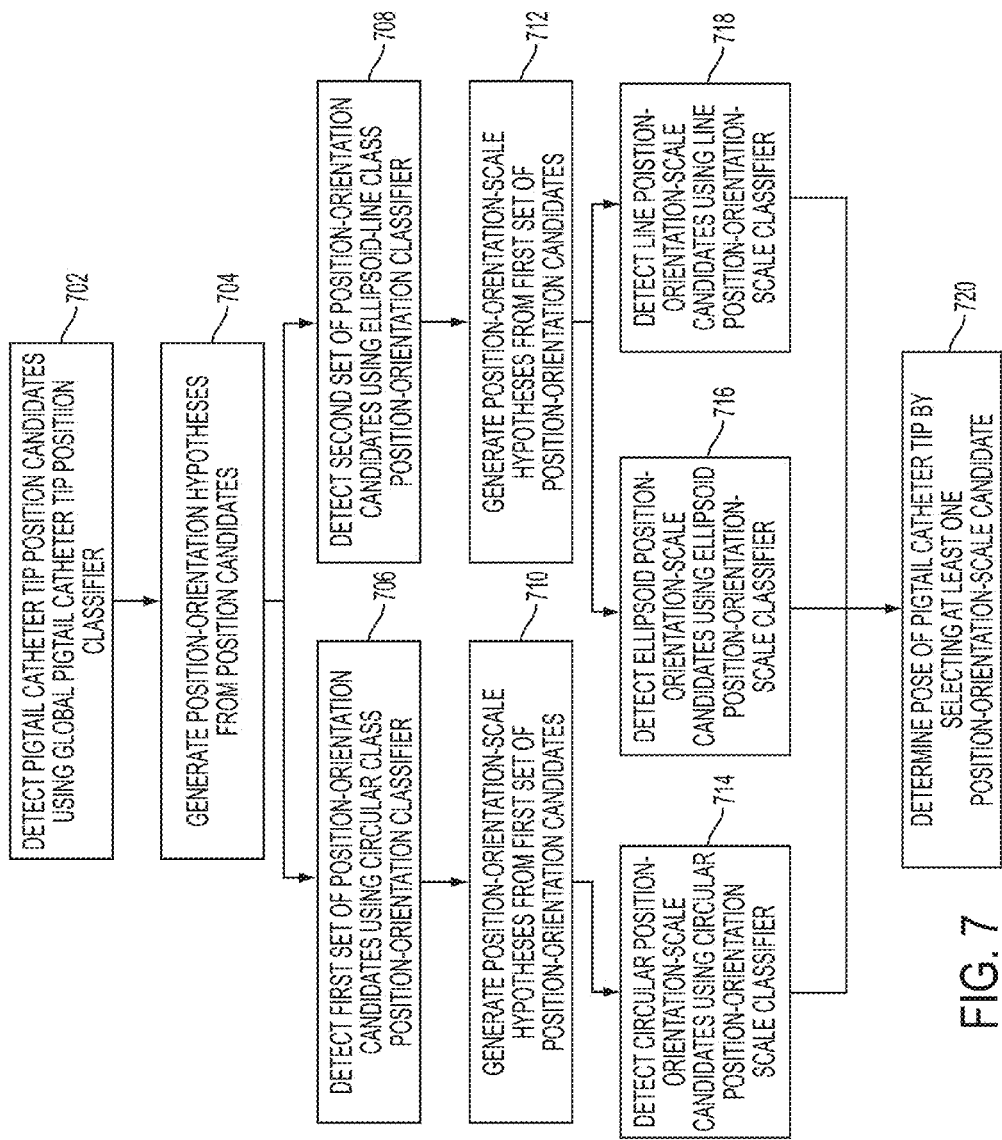
FIG. 7 illustrates a method for detecting a pigtail catheter tip in a 2D fluoroscopic image using the hierarchical tree-structured array of trained classifiers of FIG. 6 according to an embodiment of the present invention.

FIG. 7 illustrates a method for detecting a pigtail catheter tip in a 2D fluoroscopic image using the hierarchical tree-structured array of trained classifiers of FIG. 6 according to an embodiment of the present invention. It is to be understood that the method of FIG. 7 can be used to implement step 504 of FIG. 5 in cases in which the pigtail catheter tip is the target object being detected.

Referring to FIGS. 6 and 7, at step 702, pigtail catheter tip position candidates are detected in the image using the global pigtail catheter position classifier 602. At step 704, position-orientation hypotheses are generated from the detected pigtail catheter tip position candidates. The position-orientation hypotheses are generated by sampling each of the pigtail catheter tip position candidates at each of a plurality of orientations. Although illustrated as a single step in FIG. 7, it is to be understood that the circular class position-orientation classifier 604 and the ellipsoid-line class position-orientation classifier 606 can independently perform the sampling of the pigtail catheter tip position candidates, as described above. In particular, the ellipsoid-line class position-orientation classifier 606 can perform this sampling using a denser set of orientations than the circular class position-orientation classifier 604.

At step 706, a first set of pigtail catheter tip position-orientation candidates are detected from the position-orientation hypotheses using the circular class position-orientation classifier 604. In particular, the circular class position-orientation classifier 604 detects pigtail catheter tip position-orientation candidates by classifying position-orientation hypotheses as positive or negative. At step 708, a second set of pigtail catheter tip position-orientation candidates are detected from the position-orientation hypotheses using the ellipsoid-line class position-orientation classifier 606. In particular, the ellipsoid-line class position-orientation classifier 606 detects pigtail catheter tip position-orientation candidates by classifying position-orientation hypotheses as positive or negative.

At step 710, position-orientation-scale hypotheses are generated from the first set of pigtail catheter tip position-orientation candidates. The position-orientation-scale hypotheses are generated by sampling each of the first set of pigtail catheter tip position-orientation candidates at each of a plurality of scales. At step 712, position-orientation-scale hypotheses are generated from the second set of pigtail catheter tip position-orientation candidates. The position-orientation-scale hypotheses are generated by sampling each of the second set of pigtail catheter tip position-orientation candidates at each of a plurality of scales. Although illustrated as a single step in FIG. 7, it is to be understood that the ellipsoid class position-orientation-scale classifier 610 and the line class position-orientation-scale classifier 608 can independently perform the sampling of the second set of pigtail catheter tip position-orientation candidates.

At step 714, circular class pigtail catheter tip position-orientation-scale candidates are detected from the corresponding position-orientation-scale hypotheses using the circular class position-orientation-scale classifier 608. In particular, the circular class position-orientation-scale classifier 608 detects the circular class pigtail catheter tip position-orientation-scale candidates by classifying the position-orientation-scale hypotheses as positive or negative. At step 716, ellipsoid class pigtail catheter tip position-orientation-scale candidates are detected from the corresponding position-orientation-scale hypotheses using the ellipsoid class position-orientation-scale classifier 610. In particular, the ellipsoid class position-orientation-scale classifier 610 detects the ellipsoid class pigtail catheter tip position-orientation-scale candidates by classifying the position-orientation-scale hypotheses as positive or negative. At step 718, line class pigtail catheter tip position-orientation-scale candidates are detected from the corresponding position-orientation-scale hypotheses using the line class position-orientation-scale classifier 612. In particular, the line class position-orientation-scale classifier 612 detects the line class pigtail catheter tip position-orientation-scale candidates by classifying the position-orientation-scale hypotheses as positive or negative.

At step 720, a pose of pigtail catheter tip in the fluoroscopic image is determined by selecting at least one pigtail catheter tip position-orientation-scale candidate. In one possible implementation, out of all of the detected circular class pigtail catheter tip position-orientation-scale candidates, ellipsoid class pigtail catheter tip position-orientation-scale candidates, and line class pigtail catheter tip position-orientation-scale candidates, a candidate having the highest posterior probability is selected. In another possible implementation, candidates in different sub-classes are merged if they are located at the same location in the image by selecting only the candidate with the highest posterior probability. Remaining candidates with posterior probabilities greater than a threshold are then selected to determine pigtail catheter poses in the image.

Figure 8:
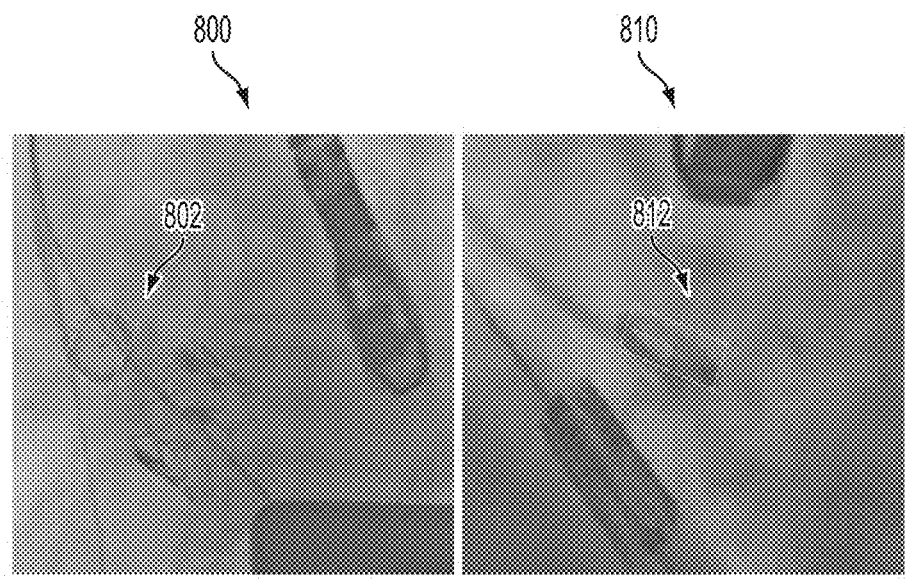
FIG. 8 illustrates exemplary pigtail catheter detection results.

FIG. 8 illustrates exemplary pigtail catheter detection results. As illustrated in FIG. 8, image 800 shows detection results for a circular pigtail catheter tip 802, and image 810 shows detection results for an ellipsoid pigtail catheter tip 812.

As described above, each classifier in the hierarchical tree-structured array of trained classifiers can be trained based on features extracted from training data belonging to the corresponding object class/sub-class. In one possible embodiment of the present invention, a Probabilistic Boosting Tree (PBT) can be used to train the classifiers. In training a PBT, a tree is recursively constructed in which each tree node is a strong classifier. The input training samples are divided into two new sets, left and right ones, according to the learned classifier, each of which is then used to train the left and right sub-trees recursively. An Adaboost feature selection algorithm is included in the training of the PBT that selects the optimal features to use to train the strong classifier at each node based on which feature provides can best discriminate between two classes (e.g., positive and negative) at a given node. This automatically selects which features to use and the order in which to use them based on the specific object being detected. Training a PBT classifier is described in detail in Tu et al., "Probabilistic Boosting-Tree: Learning Discriminative Models for Classification, Recognition, and Clustering," ICCV, 1589-1596 (2005), which is incorporated herein by reference.

Haar features have been widely used in many types of object detection due to their computational efficiency and their ability to capture primitive information of the image. For the purposes of pigtail tip detection, an extended set of 14 Haar features especially designed for medical devices can be used. This extended set of Haar features is described in greater detail in United States Published Patent Application No. 2012/009397, entitled "Method and System for Learning Based Object Detection in Medical Images", which is incorporated herein by reference. Furthermore, according to an advantageous embodiment of the present invention, a novel Haar feature is introduced that has the ability to capture the circular shape of the pigtail catheter tip. By independently handling the detection of circular and ellipsoid instances of the pigtail tip, different features can be used in each case, according to the specificities of the corresponding shape.

Figure 9:
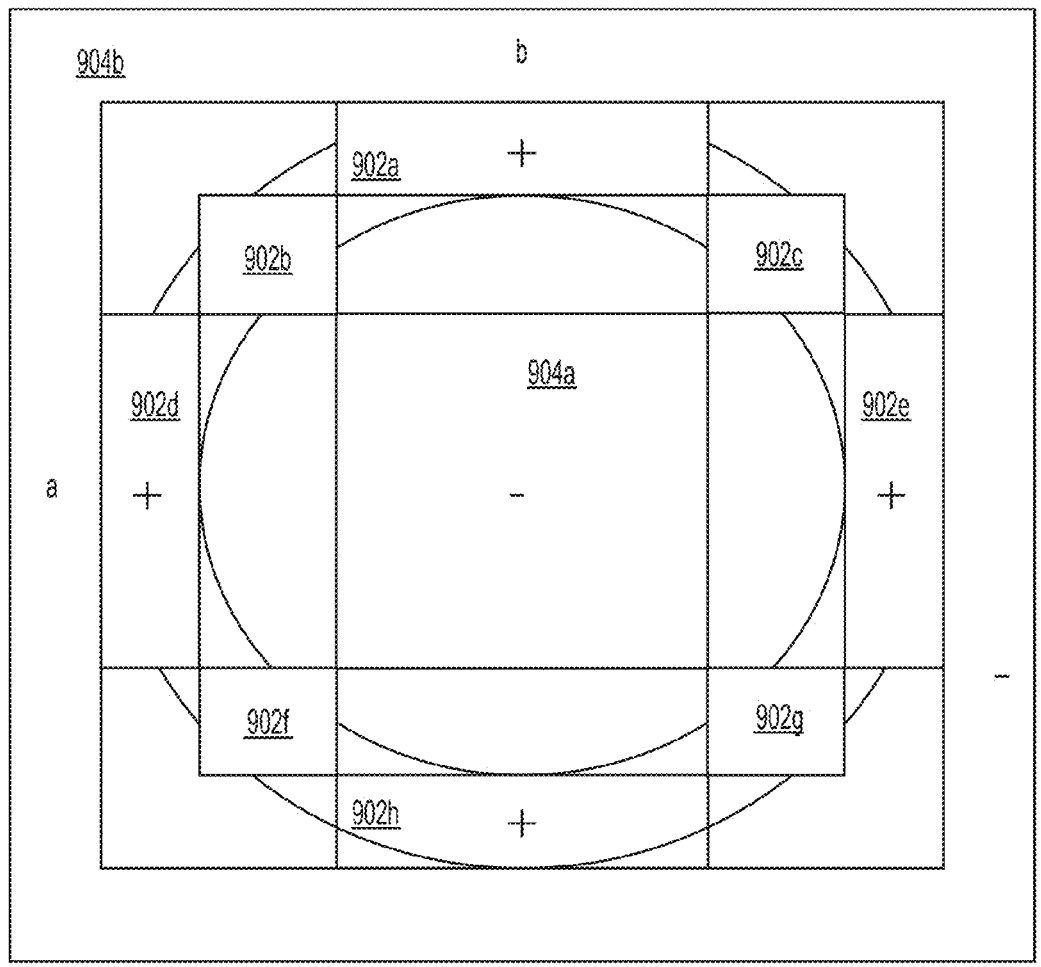
FIG. 9 illustrates a circular Haar feature according to an embodiment of the present invention.

FIG. 9 illustrates a circular Haar feature 900 according to an embodiment of the present invention. This circular Haar feature 900 has been designed in order to capture the circular shape. As illustrated in FIG. 9, the feature 900 includes positive areas 902*a-h* negative areas 904*a-b*. The negative areas include an inside part 904*a* and an outside part 904*b* that are normalized so that they will contribute the same to the final summation. The bandwidth of the positive areas 902*a-h*, and the lengths a and b constitute configurable parameters, which are optimized for the case of the pigtail catheter tip after simulations on the circular and ellipsoid shape. More specifically, the parameters a and b are proportional to the height and width of the feature according to the equations a=width/f1 and b=height/f2. The dividing factors f1 and f2 range from 2.25 to 3 according to whether the shape of the feature is pure circular or ellipsoid. In experiments by the present inventors, the circular Haar feature appears to be very dominant and successful for the circular case, as it is selected very often, and usually first, by the AdaBoost algorithm.

For the modeling of the ellipsoid instances of the pigtail tip, the two-directional features described in United States Published Patent Application No. 2012/009397 appear to be particularly successful and most often selected by the AdaBoost algorithm. The two-directional features quantify the relationship of conventional Haar features at two orthogonal directions, capturing in this way the horizontal or vertical deployment of the object.

Figure 10:
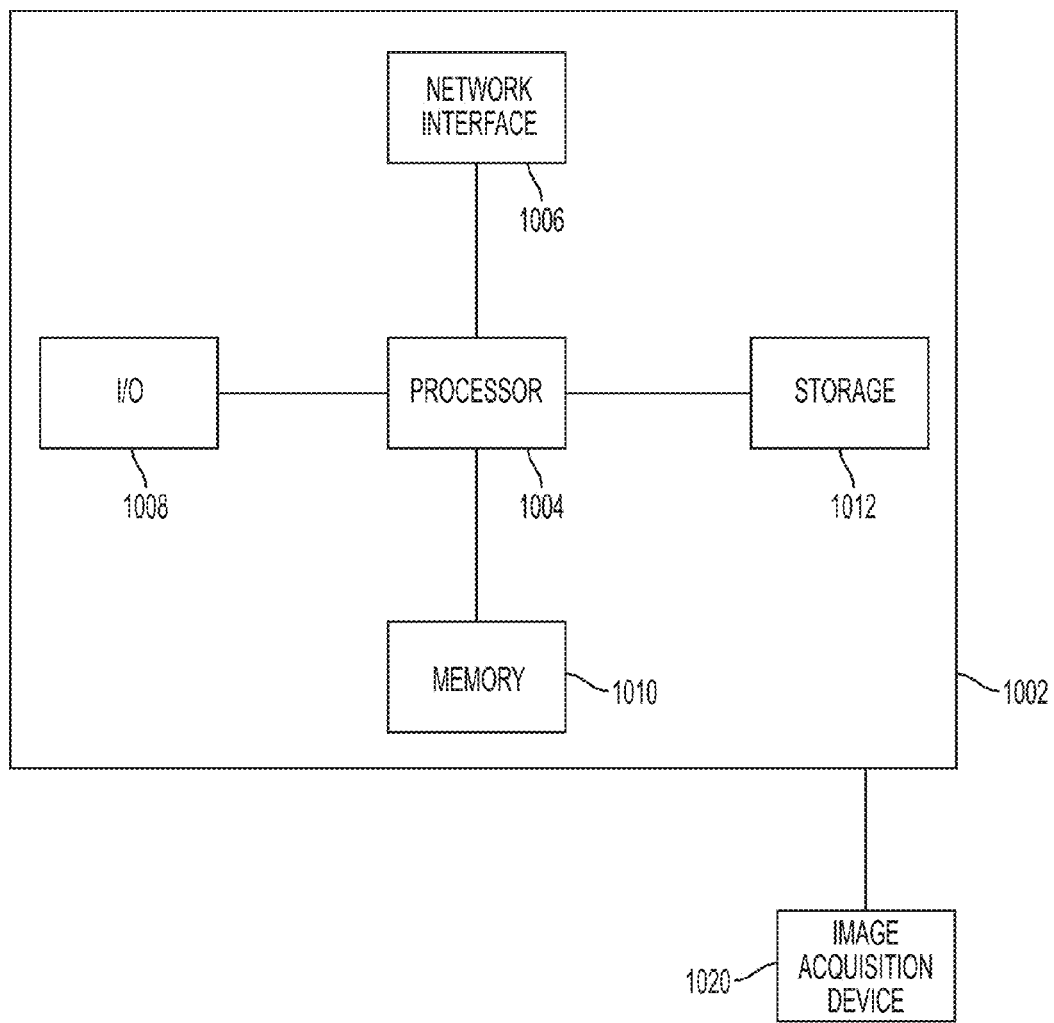
FIG. 10 is a high level block diagram of a computer capable of implementing the present invention.

The above-described methods for device detection in a 2D image may be implemented on a computer using well-known computer processors, memory units, storage devices, computer software, and other components. A high level block diagram of such a computer is illustrated in FIG. 10. Computer 1002 contains a processor 1004 which controls the overall operation of the computer 1002 by executing computer program instructions which define such operation. The computer program instructions may be stored in a storage device 1012, or other computer readable medium (e.g., magnetic disk, CD ROM, etc.) and loaded into memory 1010 when execution of the computer program instructions is desired. Thus, hierarchical tree-structured detection schemes of FIGS. 4 and 6 and the method steps of FIGS. 5 and 7 may be defined by the computer program instructions stored in the memory 1010 and/or storage 1012 and controlled by the processor 1004 executing the computer program instructions. An image acquisition device 1020, such as an x-ray acquisition device, can be connected to the computer 1002 to input images to the computer 1002. It is possible to implement the image acquisition device 1020 and the computer 1002 as one device. It is also possible that the image acquisition device 1020 and the computer 1002 communicate wirelessly through a network. The computer 1002 also includes one or more network interfaces 1006 for communicating with other devices via a network. The computer 1002 also includes other input/output devices 1008 that enable user interaction with the computer 1002 (e.g., display, keyboard, mouse, speakers, buttons, etc.). One skilled in the art will recognize that an implementation of an actual computer could contain other components as well, and that FIG. 10 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for detecting an object in a 2D medical image, comprising:
   detecting candidates for the object in the 2D medical image using a hierarchical tree-structured array of trained classifiers comprising:
      a first classifier trained for an object class to detect object candidates in a first search space, wherein the object is a pigtail catheter tip and the first classifier is a global pigtail catheter tip position classifier trained based on all shape variations of pigtail catheter tips in a set of annotated training data to detect pigtail catheter tip position candidates in the 2D image; and
      a plurality of second classifiers, each trained for a respective one of a plurality of sub-classes of the object class to detect object candidates of the respective one of the plurality of sub-classes in a second search space having a greater dimensionality than the first search space based on the object candidates detected by the first classifier, wherein the plurality of second classifiers comprise:
         a circular sub-class position-orientation classifier trained based on a circular sub-class of pigtail catheter tips in the training data to detect pigtail catheter tip position-orientation candidates based on the pigtail catheter tip position candidates detected by the global pigtail catheter tip position classifier, and
         an ellipsoid-line sub-class position-orientation classifier trained based on ellipsoid and line sub-classes of pigtail catheter tips in the training data to detect pigtail catheter tip position-orientation candidates based on the pigtail catheter tip position candidates detected by the global pigtail catheter tip position classifier.

2. The method of claim 1, wherein the plurality of sub-classes corresponds to a plurality of shape variations of the object in 2D medical images.

3. The method of claim 2, wherein the plurality of sub-classes comprises a first sub-class corresponding to a projection plane of the 2D image being substantially parallel to a plane of the object in the 2D image, a second sub-class corresponding to the projection plane of the 2D image being neither parallel nor perpendicular to the plane of the object in the 2D image, and a third sub-class corresponding to the projection plane of the 2D image being substantially perpendicular to the plane of the object in the 2D image.

4. The method of claim 1, wherein the step of detecting candidates for the object in the 2D medical image using a hierarchical tree-structured array of trained classifiers comprises:
   detecting the object candidates in the first search space using the first classifier;
   sampling each of the object candidates detected in the first search space to generate multiple hypotheses in the second search space for each of the object candidates detected in the first search space; and
   detecting candidates in the second search space for each of the plurality of sub-classes by classifying each of the generated hypotheses using each of the plurality of second classifiers.

5. The method of claim 1, further comprising:
   detecting a pose of the object in the 2D medical image by selecting at least one of the candidates for the object in the 2D medical image detected using the hierarchical tree-structured array of trained classifiers.

6. The method of claim 1, wherein
   the hierarchical tree-structured array of trained classifiers further comprises a plurality of third classifiers comprising:
      a circular sub-class position-orientation-scale classifier trained based on the circular sub-class of pigtail catheter tips in the training data to detect pigtail catheter tip position-orientation-scale candidates based on the pigtail catheter tip position-orientation candidates detected by the circular sub-class position-orientation classifier,
      an ellipsoid sub-class position-orientation-scale classifier trained based on the ellipsoid sub-class of pigtail catheter tips in the training data to detect pigtail catheter tip position-orientation-scale candidates based on the pigtail catheter tip position-orientation candidates detected by the ellipsoid-line sub-class position-orientation classifier, and
      a line sub-class position-orientation-scale classifier trained based on the line sub-class of pigtail catheter tips in the training data to detect pigtail catheter tip position-orientation-scale candidates based on the pigtail catheter tip position-orientation candidates detected by the ellipsoid-line sub-class position-orientation classifier.

7. The method of claim 6, wherein the step of detecting candidates for the object in the 2D medical image using a hierarchical tree-structured array of trained classifiers comprises:
   detecting the pigtail catheter tip position candidates using the global pigtail catheter tip position classifier;
   generating position-orientation hypotheses from the detected pigtail catheter tip position candidates;
   detecting a first set of pigtail catheter tip position-orientation candidates by classifying the position-orientation hypotheses using the circular sub-class position-orientation classifier;
   detecting a second set of pigtail catheter tip position-orientation candidates by classifying the position-orientation hypotheses using the ellipsoid-line sub-class position-orientation classifier;
   generating a first set of position-orientation-scale hypotheses from the first set of pigtail catheter tip position-orientation candidates;
   generating a second set of position-orientation-scale hypotheses from the second set of pigtail catheter tip position-orientation candidates;
   detecting circular pigtail catheter tip position-orientation-scale candidates by classifying the first set of position-orientation-scale hypotheses using the circular sub-class position-orientation-scale classifier;
   detecting ellipsoid pigtail catheter tip position-orientation-scale candidates by classifying the second set of position-orientation-scale hypotheses using the ellipsoid sub-class position-orientation-scale classifier; and
   detecting line pigtail catheter tip position-orientation-scale candidates by classifying the second set of position-orientation-scale hypotheses using the line sub-class position-orientation-scale classifier.

8. The method of claim 7, further comprising:
   determining a pose of the pigtail catheter tip in the 2D image by selecting a candidate having a highest posterior probability from the circular pigtail catheter tip position-orientation-scale candidates, ellipsoid pigtail catheter tip position-orientation-scale candidates, and line pigtail catheter tip position-orientation-scale candidates.

9. The method of claim 7, wherein the step of generating position-orientation hypotheses from the detected pigtail catheter tip position candidates comprises:
   sampling each of the pigtail catheter tip position candidates at a first plurality of orientations to generate a first set of position-orientation hypotheses for classification by the circular sub-class position-orientation classifier; and
   sampling each the pigtail catheter tip position candidates at a second plurality of orientations to generate a second set of position-orientation hypotheses for classification by the ellipsoid-line sub-class position-orientation classifier, wherein the second plurality of orientations is more densely sampled than the first plurality of orientations.

10. The method of claim 1, wherein at least one of the plurality of second classifiers is trained using a circular Haar feature extracted from the training data.

11. An apparatus for detecting an object in a 2D medical image, comprising:
   a memory storing computer program instructions; and
   a processor communicatively coupled to the memory, the processor configured to execute the computer program instructions, which, when executed on the processor, cause the processor to perform a method comprising:
   detecting candidates for the object in the 2D medical image using a hierarchical tree-structured array of trained classifiers comprising:
      a first classifier trained for an object class to detect object candidates in a first search space, wherein the object is a pigtail catheter tip and the first classifier is a global pigtail catheter tip position classifier trained based on all shape variations of pigtail catheter tips in a set of annotated training data to detect pigtail catheter tip position candidates in the 2D image; and
      a plurality of second classifiers, each trained for a respective one of a plurality of sub-classes of the object class to detect object candidates of the respective one of the plurality of sub-classes in a second search space having a greater dimensionality than the first search space based on the object candidates detected by the first classifier, wherein
the plurality of second classifiers comprise:
a circular sub-class position-orientation classifier trained based on a circular sub-class of pigtail catheter tips in the training data to detect pigtail catheter tip position-orientation candidates based on the pigtail catheter tip position candidates detected by the global pigtail catheter tip position classifier, and
an ellipsoid-line sub-class position-orientation classifier trained based on ellipsoid and line sub-classes of pigtail catheter tips in the training data to detect pigtail catheter tip position-orientation candidates based on the pigtail catheter tip position candidates detected by the global pigtail catheter tip position classifier.

12. The apparatus of claim 11, wherein the plurality of sub-classes corresponds to a plurality of shape variations of the object in 2D medical images.

13. The apparatus of claim 12, wherein the plurality of sub-classes comprises a first sub-class corresponding to a projection plane of the 2D image being substantially parallel to a plane of the object in the 2D image, a second sub-class corresponding to the projection plane of the 2D image being neither parallel nor perpendicular to the plane of the object in the 2D image, and a third sub-class corresponding to the projection plane of the 2D image being substantially perpendicular to the plane of the object in the 2D image.

14. The apparatus of claim 11, wherein the step of detecting candidates for the object in the 2D medical image using a hierarchical tree-structured array of trained classifiers comprises:
detecting the object candidates in the first search space using the first classifier;
sampling each of the object candidates detected in the first search space to generate multiple hypotheses in the second search space for each of the object candidates detected in the first search space; and
detecting candidates in the second search space for each of the plurality of sub-classes by classifying each of the generated hypotheses using each of the plurality of second classifiers.

15. The apparatus of claim 11, wherein the method further comprises:
detecting a pose of the object in the 2D medical image by selecting at least one of the candidates for the object in the 2D medical image detected using the hierarchical tree-structured array of trained classifiers.

16. The apparatus of claim 11, wherein
the hierarchical tree-structured array of trained classifiers further comprises a plurality of third classifiers comprising:
a circular sub-class position-orientation-scale classifier trained based on the circular sub-class of pigtail catheter tips in the training data to detect pigtail catheter tip position-orientation-scale candidates based on the pigtail catheter tip position-orientation candidates detected by the circular sub-class position-orientation classifier,
an ellipsoid sub-class position-orientation-scale classifier trained based on the ellipsoid sub-class of pigtail catheter tips in the training data to detect pigtail catheter tip position-orientation-scale candidates based on the pigtail catheter tip position-orientation candidates detected by the ellipsoid-line sub-class position-orientation classifier, and
a line sub-class position-orientation-scale classifier trained based on the line sub-class of pigtail catheter tips in the training data to detect pigtail catheter tip position-orientation-scale candidates based on the pigtail catheter tip position-orientation candidates detected by the ellipsoid-line sub-class position-orientation classifier.

17. The apparatus of claim 16, wherein the step of detecting candidates for the object in the 2D medical image using a hierarchical tree-structured array of trained classifiers comprises:
detecting the pigtail catheter tip position candidates using the global pigtail catheter tip position classifier;
generating position-orientation hypotheses from the detected pigtail catheter tip position candidates;
detecting a first set of pigtail catheter tip position-orientation candidates by classifying the position-orientation hypotheses using the circular sub-class position-orientation classifier;
detecting a second set of pigtail catheter tip position-orientation candidates by classifying the position-orientation hypotheses using the ellipsoid-line sub-class position-orientation classifier;
generating a first set of position-orientation-scale hypotheses from the first set of pigtail catheter tip position-orientation candidates;
generating a second set of position-orientation-scale hypotheses from the second set of pigtail catheter tip position-orientation candidates;
detecting circular pigtail catheter tip position-orientation-scale candidates by classifying the first set of position-orientation-scale hypotheses using the circular sub-class position-orientation-scale classifier;
detecting ellipsoid pigtail catheter tip position-orientation-scale candidates by classifying the second set of position-orientation-scale hypotheses using the ellipsoid sub-class position-orientation-scale classifier; and
detecting line pigtail catheter tip position-orientation-scale candidates by classifying the second set of position-orientation-scale hypotheses using the line sub-class position-orientation-scale classifier.

18. The apparatus of claim 17, wherein the method further comprises:
determining a pose of the pigtail catheter tip in the 2D image by selecting a candidate having a highest posterior probability from the circular pigtail catheter tip position-orientation-scale candidates, ellipsoid pigtail catheter tip position-orientation-scale candidates, and line pigtail catheter tip position-orientation-scale candidates.

19. The apparatus of claim 17, wherein the step of generating position-orientation hypotheses from the detected pigtail catheter tip position candidates comprises:
sampling each of the pigtail catheter tip position candidates at a first plurality of orientations to generate a first set of position-orientation hypotheses for classification by the circular sub-class position-orientation classifier; and
sampling each the pigtail catheter tip position candidates at a second plurality of orientations to generate a second set of position-orientation hypotheses for classification by the ellipsoid-line sub-class position-orientation classifier, wherein the second plurality of orientations is more densely sampled than the first plurality of orientations.

20. The apparatus of claim 11, wherein at least one of the plurality of second classifiers is trained using a circular Haar feature extracted from the training data.

21. A non-transitory computer readable medium storing computer program instructions for detecting an object in a 2D medical image, the computer program instructions when executed on a processor, cause the processor to perform a method comprising:
    detecting candidates for the object in the 2D medical image using a hierarchical tree-structured array of trained classifiers comprising:
        a first classifier trained for an object class to detect object candidates in a first search space, wherein the object is a pigtail catheter tip and the first classifier is a global pigtail catheter tip position classifier trained based on all shape variations of pigtail catheter tips in a set of annotated training data to detect pigtail catheter tip position candidates in the 2D image; and
        a plurality of second classifiers, each trained for a respective one of a plurality of sub-classes of the object class to detect object candidates of the respective one of the plurality of sub-classes in a second search space having a greater dimensionality than the first search space based on the object candidates detected by the first classifier, wherein the plurality of second classifiers comprise:
            a circular sub-class position-orientation classifier trained based on a circular sub-class of pigtail catheter tips in the training data to detect pigtail catheter tip position-orientation candidates based on the pigtail catheter tip position candidates detected by the global pigtail catheter tip position classifier, and
            an ellipsoid-line sub-class position-orientation classifier trained based on ellipsoid and line sub-classes of pigtail catheter tips in the training data to detect pigtail catheter tip position-orientation candidates based on the pigtail catheter tip position candidates detected by the global pigtail catheter tip position classifier.

22. The non-transitory computer readable medium of claim 21, wherein the plurality of sub-classes corresponds to a plurality of shape variations of the object in 2D medical images.

23. The non-transitory computer readable medium of claim 22, wherein the plurality of sub-classes comprises a first sub-class corresponding to a projection plane of the 2D image being substantially parallel to a plane of the object in the 2D image, a second sub-class corresponding to the projection plane of the 2D image being neither parallel nor perpendicular to the plane of the object in the 2D image, and a third sub-class corresponding to the projection plane of the 2D image being substantially perpendicular to the plane of the object in the 2D image.

24. The non-transitory computer readable medium of claim 21, wherein the step of detecting candidates for the object in the 2D medical image using a hierarchical tree-structured array of trained classifiers comprises:
    detecting the object candidates in the first search space using the first classifier;
    sampling each of the object candidates detected in the first search space to generate multiple hypotheses in the second search space for each of the object candidates detected in the first search space; and
    detecting candidates in the second search space for each of the plurality of sub-classes by classifying each of the generated hypotheses using each of the plurality of second classifiers.

25. The non-transitory computer readable medium of claim 21, the method further comprising:
    detecting a pose of the object in the 2D medical image by selecting at least one of the candidates for the object in the 2D medical image detected using the hierarchical tree-structured array of trained classifiers.

26. The non-transitory computer readable medium of claim 21, wherein
    the hierarchical tree-structured array of trained classifiers further comprises a plurality of third classifiers comprising:
        a circular sub-class position-orientation-scale classifier trained based on the circular sub-class of pigtail catheter tips in the training data to detect pigtail catheter tip position-orientation-scale candidates based on the pigtail catheter tip position-orientation candidates detected by the circular sub-class position-orientation classifier,
        an ellipsoid sub-class position-orientation-scale classifier trained based on the ellipsoid sub-class of pigtail catheter tips in the training data to detect pigtail catheter tip position-orientation-scale candidates based on the pigtail catheter tip position-orientation candidates detected by the ellipsoid-line sub-class position-orientation classifier, and
        a line sub-class position-orientation-scale classifier trained based on the line sub-class of pigtail catheter tips in the training data to detect pigtail catheter tip position-orientation-scale candidates based on the pigtail catheter tip position-orientation candidates detected by the ellipsoid-line sub-class position-orientation classifier.

27. The non-transitory computer readable medium of claim 26, wherein the step of detecting candidates for the object in the 2D medical image using a hierarchical tree-structured array of trained classifiers comprises:
    detecting the pigtail catheter tip position candidates using the global pigtail catheter tip position classifier;
    generating position-orientation hypotheses from the detected pigtail catheter tip position candidates;
    detecting a first set of pigtail catheter tip position-orientation candidates by classifying the position-orientation hypotheses using the circular sub-class position-orientation classifier;
    detecting a second set of pigtail catheter tip position-orientation candidates by classifying the position-orientation hypotheses using the ellipsoid-line sub-class position-orientation classifier;
    generating a first set of position-orientation-scale hypotheses from the first set of pigtail catheter tip position-orientation candidates;
    generating a second set of position-orientation-scale hypotheses from the second set of pigtail catheter tip position-orientation candidates;
    detecting circular pigtail catheter tip position-orientation-scale candidates by classifying the first set of position-orientation-scale hypotheses using the circular sub-class position-orientation-scale classifier;
    detecting ellipsoid pigtail catheter tip position-orientation-scale candidates by classifying the second set of position-orientation-scale hypotheses using the ellipsoid sub-class position-orientation-scale classifier; and detecting line pigtail catheter tip position-orientation-scale candidates by classifying the second set of position-orientation-scale hypotheses using the line sub-class position-orientation-scale classifier.

28. The non-transitory computer readable medium of claim 27, the method further comprising:
determining a pose of the pigtail catheter tip in the 2D image by selecting a candidate having a highest posterior probability from the circular pigtail catheter tip position-orientation-scale candidates, ellipsoid pigtail catheter tip position-orientation-scale candidates, and line pigtail catheter tip position-orientation-scale candidates.

29. The non-transitory computer readable medium of claim 27, wherein the step of generating position-orientation hypotheses from the detected pigtail catheter tip position candidates comprises:

sampling each of the pigtail catheter tip position candidates at a first plurality of orientations to generate a first set of position-orientation hypotheses for classification by the circular sub-class position-orientation classifier; and sampling each the pigtail catheter tip position candidates at a second plurality of orientations to generate a second set of position-orientation hypotheses for classification by the ellipsoid-line sub-class position-orientation classifier, wherein the second plurality of orientations is more densely sampled than the first plurality of orientations.

30. The non-transitory computer readable medium of claim 21, wherein at least one of the plurality of second classifiers is trained using a circular Haar feature extracted from the training data.

* * * * *